United States Statutory Invention Registration [19]

[11] Reg. Number: H480

Welch [43] Published: Jun. 7, 1988

[54] GLASS SHEET BENDING MOLD HAVING WEAR RESISTANT SURFACE

[76] Inventor: William R. Welch, 900 Sandalwood Rd. East, Perrysburg, Ohio 43551

[21] Appl. No.: 5,421

[22] Filed: Jan. 20, 1987

[51] Int. Cl.[4] ..... C03B 23/023

[52] U.S. Cl. ..... 65/287; 65/24; 65/26; 65/374.11; 65/374.13

[58] Field of Search ..... 65/24, 26, 287, 374.11, 65/374.13

[56] References Cited

U.S. PATENT DOCUMENTS 3,994,707 11/1976 Newing, Jr. et al. ..... 65/26
4,274,857 6/1981 Wolfe ..... 65/26

FOREIGN PATENT DOCUMENTS 0145131 11/1981 Japan ..... 65/26

*Primary Examiner*—John F. Terapane

*Assistant Examiner*—Eric Jorgensen

[57] ABSTRACT

An improved glass sheet bending mold (10) disclosed comprises a stainless steel base (12) for receiving the heated glass sheet to be bent. An electrically deposited metal carbide coating (16) is deposited on the stainless steel base (12). A boron nitride covering (18) covers the metal carbide coating (16) to provide a forming surface (14) that is harder than the base (12) and is wetted less by the heated glass sheet than is the base.

13 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 1
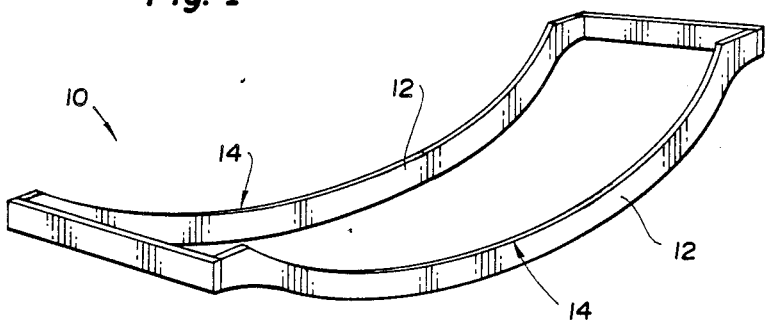
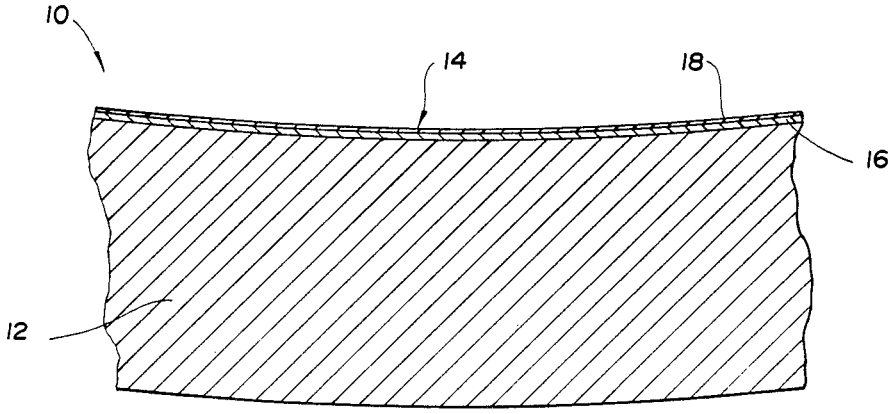
Fig. 2

GLASS SHEET BENDING MOLD HAVING WEAR RESISTANT SURFACE

TECHNICAL FIELD

This invention relates to an improved glass sheet bending mold of the type used for bending heat softened flat glass sheets.

BACKGROUND ART

Forming molds having generally curved glass bending surfaces for bending flat glass sheets into useful shapes such as automobile windshields, side windows and rear windows are generally fixed mold or articulated mold types. The fixed mold can be used in a horizontal position where gravity supplies the force that causes heat softened glass on the curved mold to sag to the extent that it comes in contact with and completely conforms to the shape of the bending surface of the mold as the glass surface slides along the curved surface of the mold. As the glass slides down the surface of the mold, the natural abrasion of the glass against the bending surface causes glass marking and mold wear. Fixed molds are also generally used for press bending heated glass sheets. In press bending, the heated glass sheets are placed between male and female mold members and a mechanical force is used to press form the glass between the bending surfaces of the mold members.

Alternatively, the articulated type mold has a hinged curved bending surface. The articulated mold also uses gravity to supply the force to bend the flat glass. This type of mold has particular application in the formation of glass sheets such as automobile windshields where the radius of curvature near the edge of the glass sheet is less than that of the windshield as a whole. Unlike the fixed shape glass forming mold, there is less tendency for the heat softened glass to slide along the surface of the mold and cause marking of the glass sheet and related mold wear that is often created when a fixed mold is used with gravity supplying the bending force. Articulated molds like fixed shape molds are commercially used for forming flat glass sheets and the associated production rates require a long mold life together with the ability to produce a high quality glass product free from marks associated with hot glass sliding along the curved mold surface.

Conventional molds are normally made of iron, steel or ceramics. Some of these molds have been known to be coated with boron nitride, graphite or various fiberglass coverings. One such mold is known to have boron impregnated directly into the surface of the mold. Nevertheless, lives of conventional molds are limited and often coatings on the molds must be continuously replaced. There is thus a need for a glass sheet bending mold that has a long life, while also minimizing glass marking even after repeated bending of the glass sheets.

Prior art references noted by a search conducted prior to filing this application are discussed below.

U.S. Pat. No. 2,201,049 to R. W. Moore for Glass Fabrication Process and Mold provides for mold members which are coated with boron nitride to prevent sticking of fluid glass to the solid mold surface.

U.S. Pat. No. 2,246,463 to Louis D. Garratt for Treatment of Mold Surfaces provides a process for depositing a graphite layer on the surface of a forming mold.

U.S. Pat. No. 2,560,599 to J. D. Ryan for Bending Mold and Method of Prolonging the Life Thereof provides for a glass forming mold having a fiberglass cover and filler.

U.S. Pat. No. 2,746,209 to E. L. Walters for Equipment for Bending Glass Sheets calls for a cast iron mold having high percentages of nickel and chromium.

U.S. Pat. No. 3,295,346 to H. B. Bomberger, Jr. for Methods for the Elevated Temperature Production of Metallic Surfaces, and Coatings Therefor discloses a boron oxide and feldspar coating for a metal surface exposed to hot processing.

U.S. Pat. No. 3,506,430 to W. W. Oelke et al for Glass Sheet Bending Mold discloses a fiber metal material covering for bending molds.

U.S. Pat. No. 3,586,493 to G. R. Claassen for Mold for Bending Glass Sheets provides for a refractory insulating coating on a bending mold.

U.S. Pat. No. 3,713,798 to Stilley et al for Method of Press Shaping Glass Sheets discloses a method of bending heat softened glass sheets against a mold member that uses a fiberglass fabric cover.

U.S. Pat. No. 3,899,316 to Ehlers for Bending of Glass Sheets provides a method of bending heated glass sheets against a resilient layer of alumino silicate fibermat material covering a mold surface.

U.S. Pat. No. 3,973,943 to Seymour for Apparatus for Supporting Shaped Glass Sheets for Tempering discloses a forming mold having a fiber reinforced resin material covering.

U.S. Pat. No. 3,994,707 to Newing, Jr. et al for Solid Film Lubricant Laminates and Their Use in Glass Manufacturing discloses a metal mold covering of nickel and chromium and metal carbides and/or transition metal nitrides together with a graphite lubricant layer. One disclosed composition of the covering has 61% Ni and 7% Cr and about 12% by weight of tungsten carbide.

U.S. Pat. No. 4,382,811, to Luscher et al for Method of Producing Protective Coating On Metal Parts to be Used in Contact With Molten Glass presents a method of flame spraying the metal part with ,hromium oxide and a nickel base alloy.

U.S. Pat. No. 4,251,254 to Klomp et al for Tools for the and Shaping of Glass discloses a tool made oi a boron containing material for the handling and shaping of glass at low viscosity.

U.S. Pat. No. 4,274,857 to Wolfe for Treating Covers for Press Bending Molds, and Method of Press Bending Glass Sheets provides a flexible cover of fiberglass fabric impregnated with a dispersion of boron nitride to be used as a cover with a press bending mold.

DISCLOSURE OF INVENTION

An object of the present invention is to provide an improved flat glass forming mold having a curved bending surface that tends not to stick to heat softened glass sheets and thereby reduces glass marking associated with the glass sheets sliding along the bending surface during the bending process.

Another object of the present invention is to provide a hard flat glass forming mold having high temperature resistance necessary to repeatedly engage hot glass and provide for an extended mold life.

In carrying out the above objects, the improved flat glass forming mold comprises a curved base for receiving the glass sheet to be bent. A glass engaging coating is applied on the base to provide a coating that is harder than the base and is wetted less by the heated glass sheet than is the base.

In a preferred construction, the mold has a fixed curvature. Also, the curved base of the forming mold is preferably made of stainless steel. Furthermore, the glass engaging coating is preferably made of a metal carbide composition, most preferably tungsten carbide.

In the preferred embodiment, the metal carbide coating is an electrical deposit about 0.003 inches thick. Preferably, the coating is a plasma deposit of the metal carbide composition although the metal carbide can be an electrostatic deposit or the result of other processes.

The forming mold includes a covering of boron nitride over the metal carbide coating. In the preferred practice disclosed, the boron nitride covering is a paste of boron nitride powder and water spread over the metal carbide coating although other coating processes may also be used.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a closed ring type flat glass forming mold constructed in accordance with the present invention; and FIG. 2 is an enlarged view of a glass engaging surface of the forming mold.

BEST MODE FOR CARRYING OUT THE INVENTION

With reference to FIG. 1 of the drawings, a glass forming mold according to the present invention is generally indicated by 10 and is used to bend heat softened flat glass sheets. As is more fully hereinafter described, the flat glass forming mold 10 reduces glass marking and mold wear associated with the bending of hot glass sheets and is highly temperature resistant. Although the forming mold 10 shown is a fixed shape closed ring mold type, the same invention can be used with an articulated type glass forming mold and other flat glass forming molds even though the invention has particular utility for molds of fixed shapes.

As shown in FIG. 1, the forming mold 10 comprises a fixedly curved base 12 for receiving a glass sheet to be bent. Curved base 12 has a glass forming surface 14 on which glass sheets are placed. The mold 10 and glass sheet are passed through a furnace where the heating softens the glass such that the sheet sags toward the shape of the forming surface 14.

As the heat softened glass sags, the glass sheet slides along the glass forming surface 14 until the glass comes in contact with and completely conforms to the shape of the forming surface 14. The forming mold 10 and formed flat glass sheet are subsequently removed from the furnace, allowed to cool, and the mold is reused.

As illustrated in FIG. 2, the curved base 12 is of a stainless steel material. A glass engaging coating 16 of a metal carbide compositior that is harder than the base 12 and is wetted less by the heated glass sheet than is the base is electrically deposited onto the base at the glass forming surface 14. Coating 16 imparts a hard wear resistant surface on the stainless steel base 12 and reduces glass marking and mold wear because of the lubricity of the surface 14.

In the preferred embodiment, the metal carbide composition is tungsten carbide which exhibits superior wear resistance and resistance to high temperatures associated with bending hot glass sheets. In the preferred embodiment, the metal carbide coating is 0.003 inches thick.

The glass engaging coating 16 is preferably formed by a plasma deposition process where the coating flows onto the base 12. An electrostatic deposition process is also suitable. Other deposition processes can also be used.

With further reference to FIG. 2, the coating 16 includes a covering 18 of boron nitride over the metal carbide deposit. Coating 16 is wetted less by the heated glass sheet reducing the natural abrasion of the hot glass sheet as it slides along the forming surface 14 during the bending process.

The boron nitride covering 18 is conveniently applied as a paste of boron nitride powder and water spread over the metal carbide coating 16 although any suitable application process can be used.

While the best mode for carrying out the invention has been described in detail, those familiar with the art to which this invention relates will recognize various alternative designs and embodiments for practicing the invention as defined by the following claims.

What is claimed is:

1. A forming mold for bending heated, flat glass sheets, the forming mold comprising: a curved base for receiving the heated glass sheet to be bent; and a glass engaging coating on the base, wherein the coating is harder than the base and is wetted less by the heated glass sheet than is the base.

2. A forming mold as in claim 1 wherein the curved base is stainless steel.

3. A forming mold as in claim 2 wherein the glass engaging coating comprises a metal carbide composition.

4. A forming mold as in claim 3 wherein the metal carbide composition is tungsten carbide.

5. A forming mold as in claim 3 or 4 wherein the metal carbide composition is an electrical deposit.

6. A forming mold as in claim 5 wherein the electrical deposit is electrostatically deposited.

7. A forming mold as in claim 5 wherein the electrical deposit is a plasma deposit.

8. A forming mold as in claim 3 or 4 wherein the metal carbide coating is about 0.003 inches thick.

9. A forming mold as in claim 3 or 4 further including a covering of boron nitride over the metal carbide coating.

10. A forming mold as in claim 9 wherein the boron nitride covering is a paste of boron nitride powder and water spread over the metal carbide coating.

11. A forming mold as in claim 9 wherein the mold has a fixed curvature on which the hot glass sheet readily slides about the boron nitride covering to conform to the shape of the mold.

12. A forming mold for bending heated, flat glass sheets, the forming mold comprising: a stainless steel base for receiving the heated glass sheet to be bent; an electrically deposited metal carbide coating on the stainless steel base; and a boron nitride covering over the metal carbide coating.

13. A forming mold for bending heated, flat glass sheets, the forming mold comprising: a stainless steel base having a fixed curvature for receiving the heated glass sheet to be bent; an electrically deposited tungsten carbide coating on the stainless steel base; and a boron nitride covering spread as a paste over the tungsten carbide coating.

* * * * *